W. H. SHERWOOD.
COFFEE-POT.
No. 192,943.        Patented July 10, 1877.
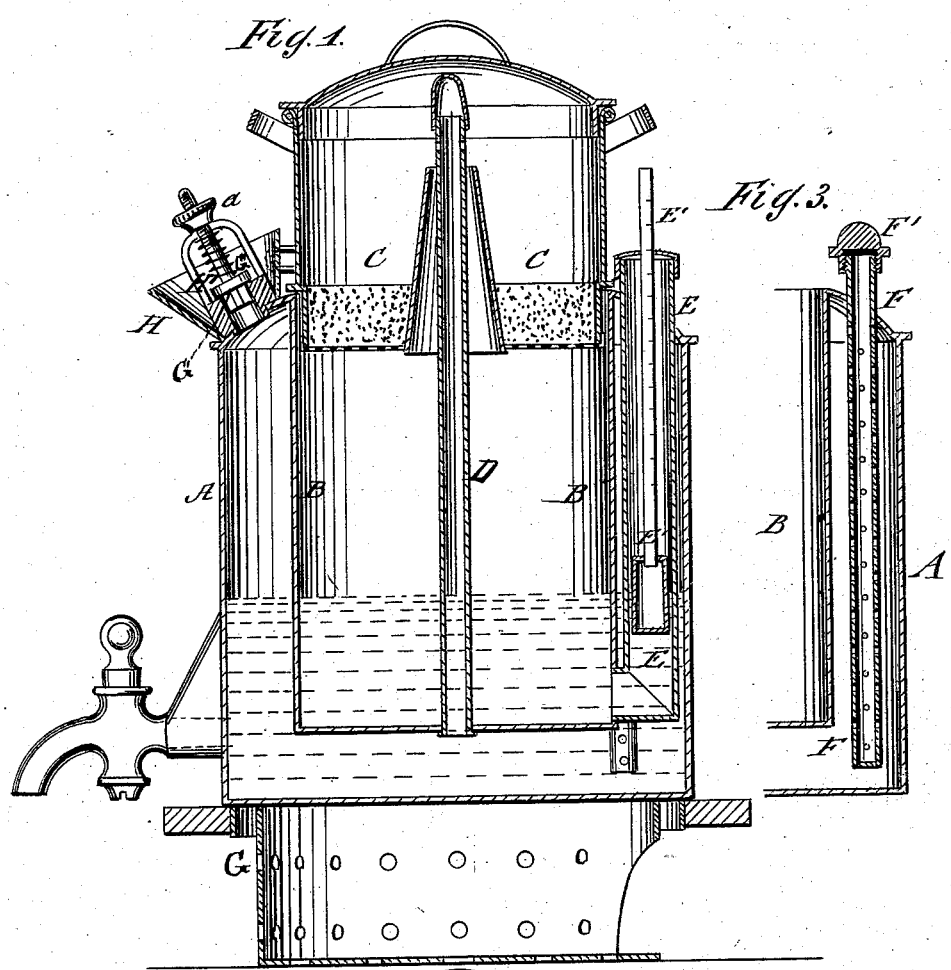
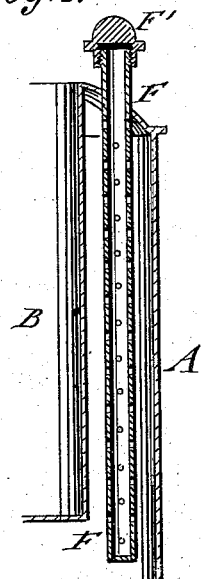
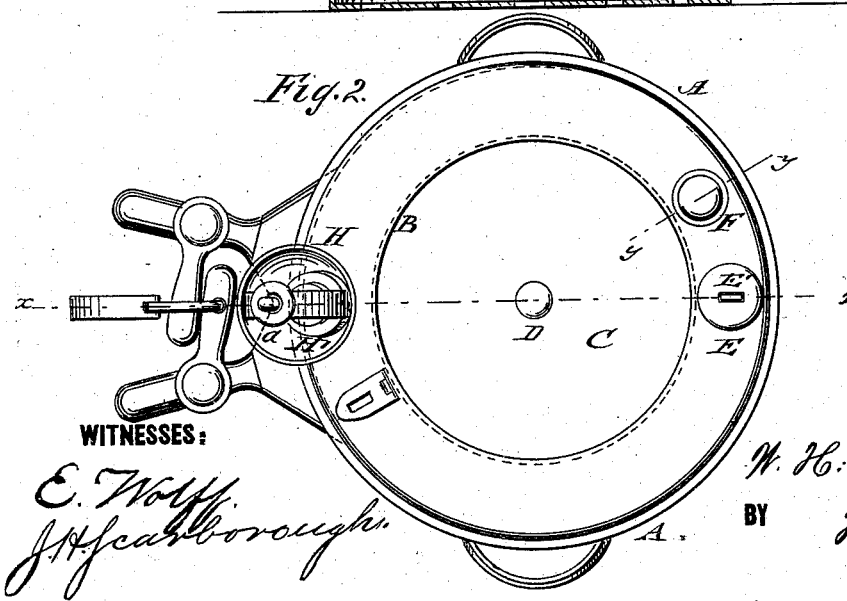
WITNESSES:
E. Wolff
J. H. Scarborough
INVENTOR:
W. H. Sherwood
BY
ATTORNEYS.

UNITED STATES PATENT OFFICE.

WILLIS H. SHERWOOD, OF ST. JOSEPH, MISSOURI.

IMPROVEMENT IN COFFEE-POTS.

Specification forming part of Letters Patent No. 192,943, dated July 10, 1877; application filed April 2, 1877.

*To all whom it may concern:*

Be it known that I, WILLIS H. SHERWOOD, of St. Joseph, in the county of Buchanan and State of Missouri, have invented a new and Improved Coffee-Pot, of which the following is a specification:

This invention relates to such improvements in the coffee pot or boiler, on which Letters Patent have been granted to me under date of June 27, 1876, and numbered 179,359, that the working of the same is facilitated, and the pot adapted in more convenient and economical manner for restaurant, hotel, and family use.

The invention consists, essentially, in the combination, with the water pot or receptacle, of a perforated steam-pipe with detachable screw-cap, for the purpose of using the coffee-pot with steam; and, secondly, of the funnel-shaped mouth of the filling-tube closed by a cap with safety-valve that may be opened at will to interrupt boiling by the thumb-screw.

In the accompanying drawing, Figure 1 represents a vertical central section of my improved coffee-pot on line $x\ x$, Fig. 2. Fig. 2 is a top view of the same; and Fig. 3 is a detail vertical transverse section of the pot or boiler on line $y\ y$, Fig. 2, showing arrangement of steam-supply tube.

Similar letters of reference indicate corresponding parts.

A in the drawing is the water pot or receptacle; B, the receiver for the decoction, which is obtained by forcing the boiling water through the connecting-tube D, and its upper perforated end into the dripping-cup C, and through the ground coffee or tea, and the strainer-bottom of the same into the receiver.

The receiver is provided with a communicating-tube, E, in which the graduated indicator or gage E′, that passes to the outside of the water-pot, is raised or lowered by a hollow float of sheet metal, so as to indicate the quantity of coffee or tea in the receiver.

The water-pot A is provided with a perforated tube, F, that extends from the top downward to some distance from the bottom, so as to admit, by screwing to the outer end of tube F a pipe-connection with a steam-boiler, the heating of the water by steam.

When the pot or boiler is to be be heated by gas, petroleum, or otherwise, the tube F is closed by a tightly-sealing screw-cap, F′, and the coffee-pot then supported on a suitable stand, G, for the lamp.

The water-pot A is provided at the filling-opening with a funnel, H, to facilitate the filling of the pot with water, the opening being closed by a cap with a spring-acted safety-valve, G′, that is opened or closed at will by a set-screw, $a$, applied to the threaded stem of the valve H′. By turning the valve on the stem, the same may be withdrawn from the opening, and thereby the steam in the boiler allowed to escape whenever it is desired to interrupt the process of making coffee.

Both the receiver and water-pot are provided with faucets to draw off their contents, the handle of the faucets being connected by a padlock, the dripping-cup being also locked in similar manner to the water-pot, so as to allow only the attendant, who has the keys, to draw coffee from the boiler.

For boilers of larger size than ten gallons, for hotels and restaurants, it is advisable to use steam; for those of less size any heating device may be used.

The pot may also be made for family use, in which case the steam-tube is not required, the valve, funnel, and thumb-screw forming the main feature of the same.

Having thus described my invention, I claim as new and desire to secure by Letters Patent—

1. The combination, with the water-receptacle of a coffee pot or boiler having interior receiver, connecting-tube, dripping-cup, and strainer, of a perforated steam-supply tube extending nearly to the bottom of the pot, and provided with a detachable screw-cap, substantially in the manner and for the purpose set forth.

2. The spring-valve G′, in filling-tube, opened and closed by a set-screw, $a$, applied to the threaded stem of valve, as shown and described, for the purpose specified.

WILLIS H. SHERWOOD.

Witnesses:
W. B. STROUD,
WILLIAM LORING.